US010949730B2

(12) United States Patent
Paidimarri et al.

(10) Patent No.: US 10,949,730 B2
(45) Date of Patent: Mar. 16, 2021

(54) LEVERAGING CHANNEL DIVERSITY IN WIRELESS POWER AND COMMUNICATION

(71) Applicant: International Business Machines Corporation, Armonk, NY (US)

(72) Inventors: Arun Paidimarri, White Plains, NY (US); Bodhisatwa Sadhu, Peekskill, NY (US); Duixian Liu, Scarsdale, NY (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/277,273

(22) Filed: Feb. 15, 2019

(65) Prior Publication Data

US 2020/0265285 A1   Aug. 20, 2020

(51) Int. Cl.
*G06K 19/077* (2006.01)
*G06K 7/00* (2006.01)

(52) U.S. Cl.
CPC ....... *G06K 19/0775* (2013.01); *G06K 7/0008* (2013.01); *G06K 19/0773* (2013.01); *G06K 19/07796* (2013.01)

(58) Field of Classification Search
CPC .......................... G06K 19/0775; G06K 7/0008
USPC ........................................................ 235/492
See application file for complete search history.

(56) References Cited

U.S. PATENT DOCUMENTS

| 6,069,564 A | 5/2000 | Hatano et al. |
| 6,745,008 B1 | 6/2004 | Carrender et al. |
| 7,091,860 B2 * | 8/2006 | Martinez de Velasco Cortina ..... G06K 19/0723 340/10.1 |
| 7,873,326 B2 | 1/2011 | Sadr |
| 8,217,760 B2 | 7/2012 | Wild et al. |

(Continued)

FOREIGN PATENT DOCUMENTS

| WO | 2009/117604 A1 | 9/2009 |
| WO | 2015/084555 A1 | 6/2015 |

OTHER PUBLICATIONS

Ali, M., et al., "A New Circularly Polarized Rectenna for Wireless Power Transmission and Data Communication", IEEE Antennas and Wireless Propogation Letters, Feb. 2005, pp. 205-208, vol. 4.

(Continued)

*Primary Examiner* — Toan C Ly
(74) *Attorney, Agent, or Firm* — Scully, Scott. Murphy & Presser, P.C.; Daniel P. Morris

(57) ABSTRACT

A radio frequency identification (RFID) system. An RFID tag may include multiple antennas connected with associated circuitry. An RFID tag's multiple antennas and associated circuitry are connected in parallel, and output power of the multiple associated circuitry can be combined. Each of the multiple antennas can be tuned for a different operating property or region. An RFID reader can include multiple antennas connected with associated circuitry. RFID reader's multiple antenna interfaces connect with a baseband processor, which can integrate resources of the reader's multiple antennas and associated circuitry. RFID tag and/or reader can be configured to support wireless channel diversity in enhancing at least one of power delivery and communication link budget.

19 Claims, 8 Drawing Sheets

(56) References Cited

U.S. PATENT DOCUMENTS

| | | |
|---|---|---|
| 8,294,554 B2 | 10/2012 | Shoarinejad et al. |
| 8,461,817 B2 | 6/2013 | Martin et al. |
| 9,153,998 B2 | 10/2015 | Mayo |
| 9,262,912 B2 | 2/2016 | Wild et al. |
| 9,291,699 B2 | 3/2016 | Sadr |
| 2007/0191074 A1 | 8/2007 | Harrist et al. |
| 2007/0298846 A1 | 12/2007 | Greene et al. |
| 2008/0150691 A1 | 6/2008 | Knadle et al. |
| 2008/0157972 A1 | 7/2008 | Duron et al. |
| 2008/0227478 A1 | 9/2008 | Greene et al. |
| 2010/0060424 A1 | 3/2010 | Wild et al. |
| 2011/0169607 A1 | 7/2011 | Paulson |
| 2013/0201003 A1 | 8/2013 | Sabesan et al. |
| 2013/0299593 A1* | 11/2013 | Glidden, III ....... G06K 19/0723 235/492 |
| 2016/0359378 A1 | 12/2016 | Kuhn et al. |
| 2017/0286730 A1 | 10/2017 | Sadr |
| 2018/0253679 A1 | 9/2018 | Chritz et al. |
| 2018/0331581 A1* | 11/2018 | Hosseini ................ H02J 50/40 |

OTHER PUBLICATIONS

Trotter, M.S., et al., "Multi-Antenna Techniques for Enabling Passive RFID Tags and Sensors at Microwave Frequencies," 2012 IEEE International Conference on RFID (RFID), Apr. 3-5, 2012, pp. 1-7.

Karmakar, N.C., "Tag, You're It", IEEE Microwave Magazine, Jul. 2016, pp. 64-74.

Huang, Y., et al., "Active RFID location system based on time-difference measurement using a linear FM chirp tag signal", 2008 IEEE 19th International Symposium on Personal, Indoor and Mobile Radio Communications, Sep. 15-18, 2008, pp. 1-5.

Yang, G., et al., "Multi-Antenna Wireless Energy Transfer for Backscatter Communication Systems", arXiv:1503.04604v1, Mar. 16, 2015, pp. 1-30.

List of IBM Patents or Patent Applications Treated as Related, dated Feb. 15, 2019, 2 pages.

Office Action dated Jul. 15, 2020 received in U.S. Appl. No. 16/277,280, 14 pages.

* cited by examiner

LEVERAGING CHANNEL DIVERSITY IN WIRELESS POWER AND COMMUNICATION

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in the invention.

BACKGROUND

The present application relates generally to wireless power and communication. In one aspect, the present application relates more particularly to communications between readers and tags.

Radio frequency identification (RFID) reader and tags employ wireless technology for communications and power delivery or power harvesting. In general, an RFID reader propagates or emits signals to an RFID tag, for example, to obtain information or data from the tag. The RFID tag, which can be attached to an object, may receive the emitted signal and communicate its data to the reader. In this way, RFID systems can be used for purposes of locationing, monitoring or tracking of objects. Some RFID tags may utilize electromagnetic wave backscatter to communicate tag data to the reader.

BRIEF SUMMARY

Leveraging channel diversity in transmitting wireless power and communication may be provided. A system, in one aspect, may include a radio frequency identification (RFID) tag, which includes multiple antennas connected with associated circuitry. In one aspect, each of the multiple antennas is tuned for a different operating property. The radio frequency identification tag is configured to support wireless channel diversity in enhancing at least one of power delivery and communication link budget. In one aspect, the system may also include a reader device comprising multiple radio frequency antennas connected with associated transceivers.

A method, in one aspect, may include, in a radio frequency identification (RFID) tag, connecting multiple antennas with associated circuitry in parallel. The method may also include tuning each of the multiple antennas for a different operating region such that the radio frequency identification tag is configured to support wireless channel diversity in enhancing at least one of power delivery and communication. The different operating region may include at least one of frequency, polarization, bandwidth, range and power level.

A method, in another aspect, which can be performed by a radio frequency identification (RFID) tag, may include receiving a mode of operation. The method may also include listening for communication on a plurality of operating regions, the communication being radiated by an RFID reader radiating power on the plurality of operating regions. The method may also include, based on the mode of operation, selecting a set of operating regions to operate in. The method may also include communicating in the selected set of operating regions. The method may further include receiving a feedback from an RFID reader. The method may further include switching the mode of operation based on the feedback.

Further features as well as the structure and operation of various embodiments are described in detail below with reference to the accompanying drawings. In the drawings, like reference numbers indicate identical or functionally similar elements.

DETAILED DESCRIPTION

The wireless channel has various diversity features that interact to set an operating region's characteristics such as distance, data rate, throughput, sensing and locationing. Diversity in wireless channel, for example, can result from different frequency, antenna polarization and directionality of signals or waves and other objects in the environment. Circuit design can provide additional optimization variables through modes for varying power consumption, bandwidth and data rates.

Methods, systems and devices are disclosed in embodiments, which can improve performance of a reader-tag system and enable operations, which leverage channel diversity. In some embodiments, a tag design may be provided that operates with multiple antennas, each of which can be optimized for different channels; a reader may be provided with multiple degrees of freedom, and protocols can be provided, which leverage the diversity to enhance a system operation.

In some embodiments, methods, systems and devices may employ various diverse features of the wireless channel to enhance one or more of: power delivery and communications. Power may be delivered through different channels. For instance, diversity of channel and circuit may be utilized by implementing multiple different antennas on the tags. Each of the antennas can be optimized for different channels, and circuit modes can be optimized for different operations. In some embodiments, wireless channel diversity may be leveraged to provide for higher reliability, longer range and higher net throughput. In some embodiments, antenna backscatter may be optimized, for example, for one or more of highest average power or for highest backscatter link margin by using the multiple antennas in a reader-tag system.

A tag can have multiple antennas. Each antenna in a tag can be tuned for a different operating region (frequency, polarization, bandwidth, range and power level), enabling or allowing a reader-tag system to leverage wireless channel diversity, for example, for improved performance, locationing and/or other improvements. An embodiment of a reader-tag system design can include multiple radio frequency (RF)-to-direct current (DC) converters that combine the DC power output such that when no power is available on a given port, the converter contributes no loading, and each converter's interface allows backscatter based communication. In some embodiments, a generalized energy collected active radio frequency identification (RFID) operation in conjunction with multiple antennas, or other battery and energy harvesting techniques may be provided. In general, RFID operations may be improved in terms of range, robustness and flexibility of data and power delivery.

Figure 1:
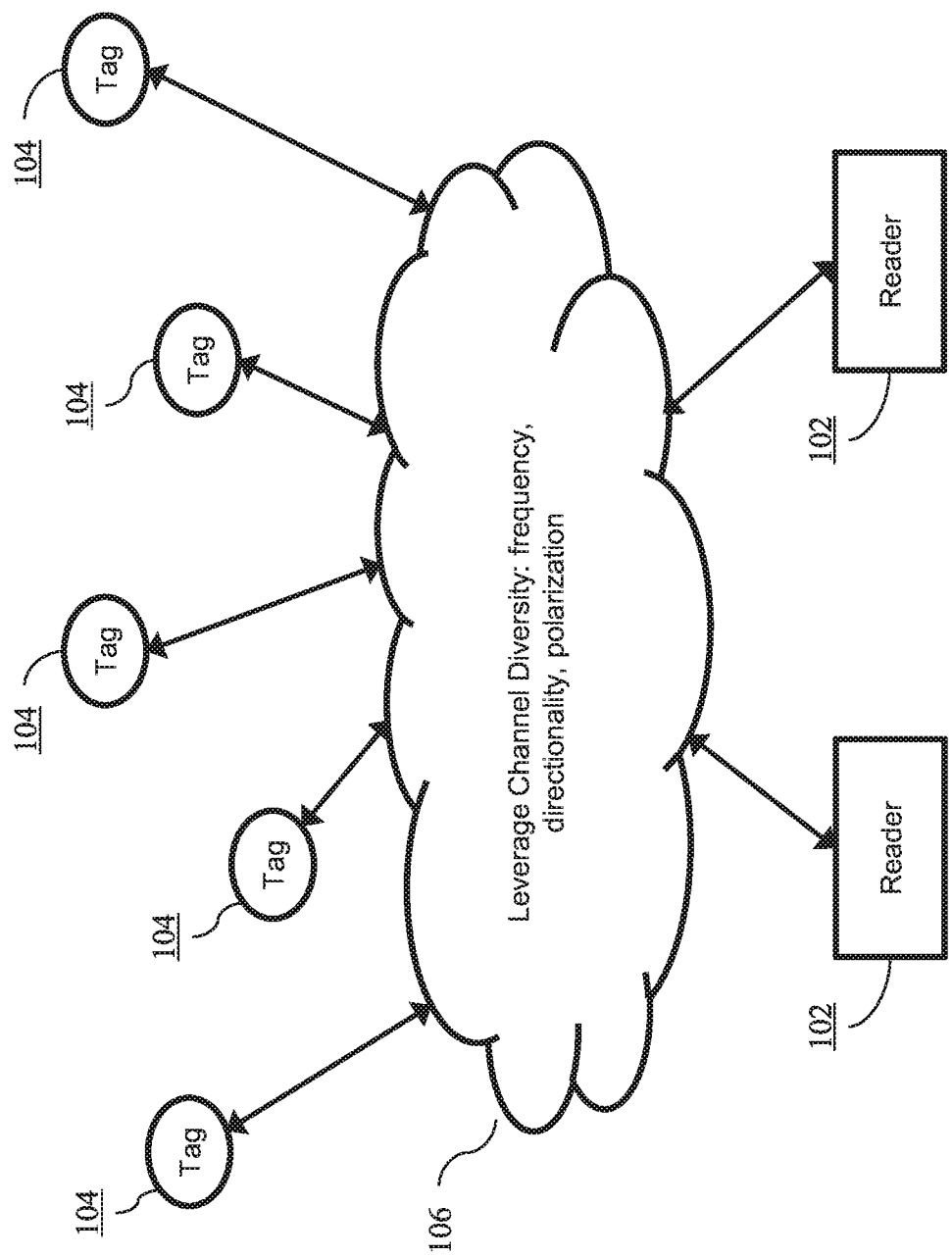
FIG. 1 is a diagram showing architecture of a reader-tag technology in one embodiment.

FIG. 1 is a diagram showing architecture of a reader-tag technology in one embodiment. One or more RFID reader devices 102 (also referred to herein as a reader) may communicate with one or more RFID tag devices 104 (also referred to herein as a tag) over a wireless communications network or channel 106, where there is multiple degrees of freedom and communications can occur with diverse characteristics such as frequency of operation, directionality of antennas and polarization in which the antennas communicate or radiate waves. The diverse characteristics are variables which are affected by a goal of a given environment (e.g., amount of range in terms of distance, the data that can be communicated, throughput of the network). The devices 102, 104 are configured to leverage channel diversity such as frequency, directionality and polarization, such that power delivery and/or communication link budget can be optimized. The devices 102, 104 are configured to leverage channel diversity such as frequency, directionality and polarization, such that power delivery and/or communication link budget can be optimized. In one embodiment, optimization has an objective function, also referred to as a cost function, which can be maximizing power delivery, maximizing communication link margin, or maximizing a weighted function of power delivery and communication link margin. Any one of those optimizations are possible. A choice may depend on, or may be based on, a system's operation.

An RFID system, for example, can be used in locationing, identifying objects, and other purposes. An RFID reader 102 may include an antenna and an associated circuitry such as a transceiver. An antenna can be a coil, and can receive and transmit power wirelessly. An RFID tag 104 may include an antenna and associated circuitry such as a RF-to-DC converter. Generally, the reader's antenna may emit or transmit communication in the form of energy such as electromagnetic waves or signals, for example, generated at the reader's transceiver. The tag's antenna may receive the emitted signals and may communicate data signals back to the reader. In one aspect, an ability to vary different operating properties or regions in communicating between a reader and a tag is provided, which allows for optimization in communications.

Figure 2:
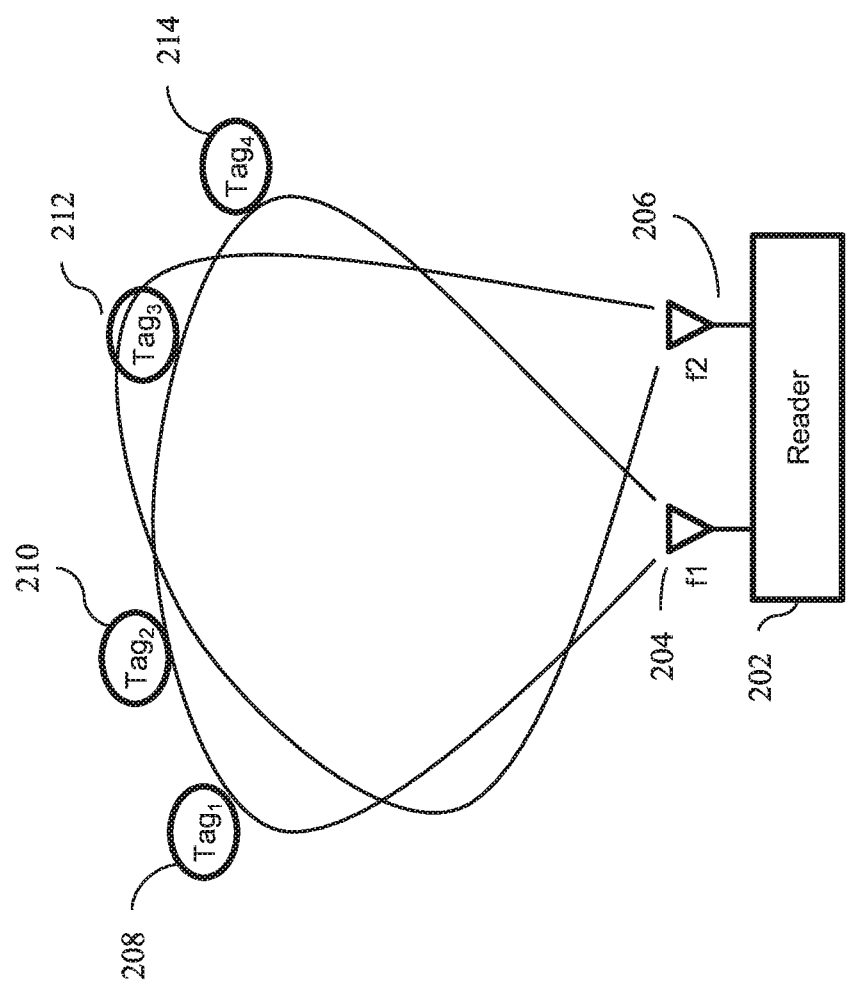
FIG. 2 is a diagram illustrating an overview of a reader device and tag devices in one embodiment.

FIG. 2 is a diagram illustrating an overview of a reader device and tag devices in one embodiment. Reader device 202 may be configured with multiple antennas 204, 206 or access to multiple antennas 204, 206. Each of the multiple antennas 204, 206 and associated circuitry may support (e.g., may be operating at) different frequencies and/or antenna polarization and have the ability to deliver power to and communicate with tags 208, 210, 212, 214. Multiple tags 208, 210, 212, 214 may be placed in a field. A tag can also be coupled with a sensor such as a temperature sensor or another sensor device. In one aspect, such a tag can communicate sensed data, for example, to a reader device. Each tag 208, 210, 212, 214 can be configured with multiple antennas and circuitry that support a respective antenna. The antennas and associated circuitry can be co-optimized to receive signals or waves (e.g., electromagnetic waves) in different frequencies and/or polarizations. For example, each of the antennas configured in a tag 208, 210, 212, 214 can have an ability to receive power from the reader device 202 and communicate with the reader device 202 at any of the frequencies that the reader device 202 operates in and the polarizations the reader device 202 operates in. Different frequencies may include various frequencies in which an RFID reader-tag system can operate in; different polarizations may include, but not limited to horizontal and vertical polarizations. Implementing a reader device 202 and a tag 208, which can operate with diverse channel characteristics (e.g., multiple frequencies and multiple polarizations), enables the RFID reader-tag system to operate with improved range and/or robustness, for instance, the system configuration choice chosen or optimized depending on the diverse channel characteristics for a given environment. For instance, having an RFID reader-tag system with one or more readers and one or more tags configured with an ability to operate in diverse characteristics, a characteristic can be selected for a reader or tag to operate in, depending on a given goal and/or given environment.

As an example, wireless channel diversity can be utilized to enhance power delivery or to communicate and deliver power to RFID tags 208, 210, 212, 214. For instance, using different channel characteristics can lead to a reader-tag system operation with higher reliability, longer range and/or higher net throughput. In some embodiments, a reader-tag system may assign a function (e.g., mode of operation) to a given channel interface (e.g., an antenna among multiple antennas configured in a tag) depending on the performance metric to be optimized. Examples of a function or mode of operation may include communication and power delivery. For instance, a mode of operation can be optimizing power delivery or communication or a combination of power delivery and communication.

For power, in some embodiments, a tag adds the power from all interfaces. Configuration such as "number of stages of rectifiers" or "configuration of DC/DC converter" can be static configuration of the tag that is optimized for use case. In some embodiment, the tag can have a dynamic configuration. For example, the tag may start in the lowest power mode, evaluate power availability and then reconfigure itself based on the evaluated power availability. Such reconfiguration can be reconfiguring of voltage levels, speeds, enabling and/or disabling of features.

In some embodiments, a reader can also send commands to a tag to change power harvesting configurations, for example, to indicate change of reader configuration itself, or if the reader moves physical location.

For communication, in some embodiments, a tag responds with backscatter on the same antenna that it receives a command. In these cases, this configuration is reader-driven. In some embodiments, a reader can indicate in the reader's command to a tag, which antenna to use for the backscatter. In some embodiments, it is also possible for the tag to backscatter on another interface; in those cases, a reader looks out for backscatter communication on that frequency (used by the interface the tag used to backscatter) as well. In this way, a reader-tag system can operate the downlink and uplink on different interfaces.

In some embodiment, for example, in the case where a reader sends commands on all channels simultaneously, or in the case where a tag has the dual polarized antennas at the same frequency, the tag configuration of how a tag backscatters (weaker antenna, stronger antenna or both) can be based on tag logic initially, in which a tag's logic 320 considers a tradeoff between power availability and communication fidelity.

In some embodiments, for instance, if a reader has all information on a channel, power delivery and communication SNRs, the reader can make an optimal choice and send commands assigning a function to a tag.

As an example, if highest power delivery is desired (mode of operation), a tag antenna can be assigned, which has better propagation characteristics, to a reader for power reception, and another tag antenna can be assigned to backscattering for communications. As another example, if highest communication link margin is desired, a tag antenna can be assigned, which has better propagation characteristics, to a reader for backscattering. Both antennas can be assigned at the same time as well. For instance, backscatter can be used with a weaker antenna of the multiple antennas configured in an RFID tag responsive to determining that the power delivery is to be optimized. In another example, backscatter can be used with a stronger antenna responsive to determining that the communication link budget is to be optimized. In general, an operating property (different operating characteristics that effect channel diversity) may be selected based on determining whether to optimize power delivery or communication link budget or combinations of power delivery and communication link budget. Briefly, a communication link budget refers to all gains and losses in signal propagation through a communication medium, e.g., free space, between a reader and a tag. For example, at a reader side, a link budget can be known. The amount of power a tag is receiving can be also known.

The following describes examples of channel use optimization in some embodiments. It is noted that the channel use optimization of the present disclosure is not limited to the below examples only. In one example, channel use optimization may be effected based on frequency selection. For example, a reader device (also referred as a reader) may choose a frequency band with the least interference for data communication while a tag device (also referred to as a tag) "listens on all channels" for a synchronous word. The reader may radiate power on all frequency bands while the tag communicates back on the band that the tag estimates to be the best based on a particular scenario or environment. For instance, to maximize power harvesting, the tag communicates on the frequency band with higher power. To maximize communication link budget at the reader, the tag communicates on the frequency band with higher power. In one aspect, the mode of operation may be switched based on feedback from the reader.

As another example, a reader device may use polarization diversity for optimizing wireless communications. For instance, the reader may radiate power on all polarizations. A tag having access to multiple polarizations (e.g., the tag's antennas and circuit configurations implemented to access multiple polarization) can communicate back to, one or more of, maximize power budget or maximize communication link budget. In one aspect, whether to maximize power or link budget may be determined based on feedback from the reader. If a tag device has antennas without reconfigurability for polarization (e.g., a tag may have multiple antennas, all operating at different frequencies, but at any one frequency, only one polarization is supported), the reader may tune the reader's polarization to maximize communication link budget. Because of the reciprocal channel characteristics, the reader's retuning automatically maximizes the power received by the tag as well. In one aspect, a tag device, once implemented or configured with multiple antennas and associated circuit configurations, need not be reconfigured for the optimization.

Figure 3:
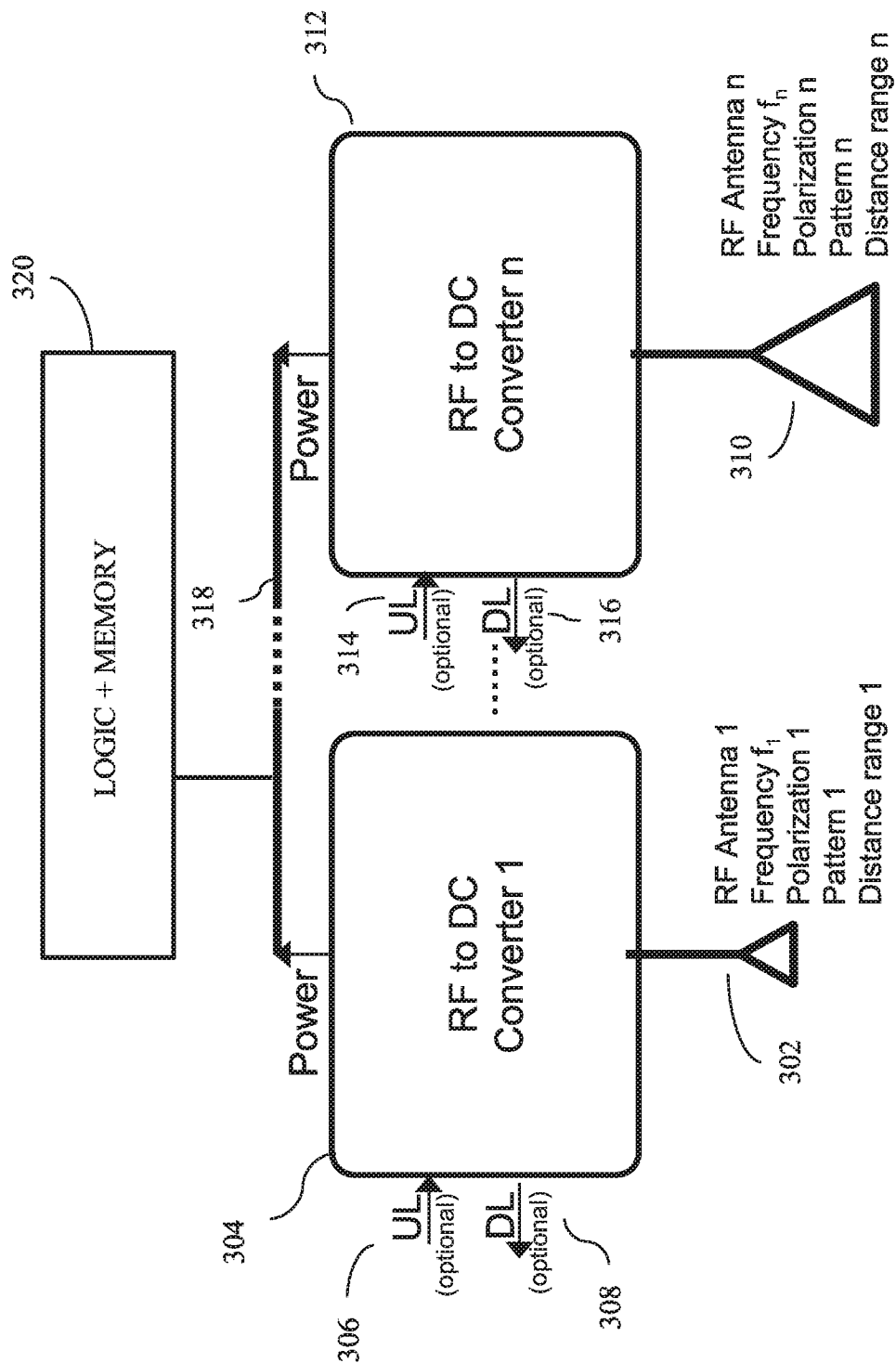
FIG. 3 is a diagram illustrating a tag configuration in one embodiment.

FIG. 3 is a diagram illustrating a tag configuration in one embodiment. In one embodiment, a tag can include circuitry with multiple antenna interfaces. For example, circuitry may include multiple RF-to-DC converters connected in parallel. An RF-to-DC converter 304 can have an antenna or an antenna interface 302. An RF-to-DC converter 304 can also include an uplink communication interface 306 for performing uplink to a reader device based on backscatter (e.g., modulate or reflect radio frequency signal transmitted to the tag), and a downlink communication interface 308 for downlink based on amplitude modulated from a reader device. Similarly, another RF-to-DC converter 312 can have an antenna or an antenna interface 310. RF-to-DC converter 312 can also include an uplink communication interface 314 that for performing uplink to a reader device based on backscatter (e.g., reflect radio frequency signal transmitted to the tag), and a downlink communication interface 316 for downlink based on amplitude modulated from a reader device. Multiple of such RF-to-DC converters 304, 312 and antenna interfaces 302, 310 are connected in parallel, and configured in a tag device. The present disclosure does not limit the number of antenna interfaces configured for a tag device. In one aspect, factors such as an underlying circuit area, tag size, silicon integrated circuit (IC) size (e.g., due to number of connections needed for external antennas and the required pads), size of solution (e.g., antenna designs, operable interaction between antennas), cost (e.g., due to size and/or number of layers in an interposer or package technology to implement the antennas), can be considered. In one aspect, multi-band antennas that operate at multiple frequencies can complement a given antennas interface. For example, a tag device can include multiple antennas and associated circuitry connected in parallel. Each antenna may be tuned for a different operating region (e.g., frequency, polarization, bandwidth, range and power level). Such tuning enables the RFID reader-tag system to leverage the channel diversity for improved performance and to enable location, and/or other functions. For instance, an antenna 302 may be tuned for frequency f1, polarization 1, radiation pattern 1 and distance range 1, while an antenna 310 can be tuned for frequency fn, polarization n, radiation pattern n and distance range n. In one aspect, diversity can occur with any combination of different operating features.

Tag antennas and their associated circuitry can be optimized for different frequencies, polarizations, radiation patterns, and/or other properties. Such tag implementation can be used for multi-frequency, wide-band power delivery. For instance, in a tag, one antenna can be optimized for 5.8 GHz frequency band, and another for 28 GHz frequency band. The tag antennas and their associated circuitry can also be optimized for different modes of operation, for example, one or more for power, one or more for data uplink and one or more for data downlink. In one example, an antenna and associated circuitry can be chosen for data, while that antenna with another antenna can be chosen for power delivery. In some embodiments, a tag's RF-to-DC converters can work with any of the modes of operation and a mode can be selected independently. In one aspect, configuration bits, antenna design and package design can decide data modes, voltage output and frequency.

DC power outputs of each RF-to-DC converter 304, 312, can be combined to provide an aggregated power output, for example, as shown at 318. For instance, powers output by each RF-to-DC converter are added, for example, for use. In one embodiment, the circuit can be constructed such that if no power is received from a particular antenna, an associated RF-to-DC converter associated with that particular antenna contributes minimal loading (DC or RF) on RFID reader-tag system. In one aspect, an RF-to-DC converter 304, 312, allows backscatter communication on any of the antenna interfaces.

In one aspect, a controller or another device can use a tag implementation shown in FIG. 3 as a building block of a desired RFID system. A module design may be contemplated. For example, the tag's rectifiers can be designed inside an integrated circuit while the antennas can be designed external to the integrated circuit such that the mode of operation can be selected by selecting external components or configuration bits on the integrated circuit while using the same integrated circuit. Such design, for example, can be implemented on a RFID-based computer. Yet in another aspect, the tag's antenna and an associated circuitry (e.g., RF-to-DC converter, e.g., implemented with rectifier, data path and power converter) can be on an integrated circuit, on a package, or printed circuit board (PCB), or combinations thereof.

Figure 4:
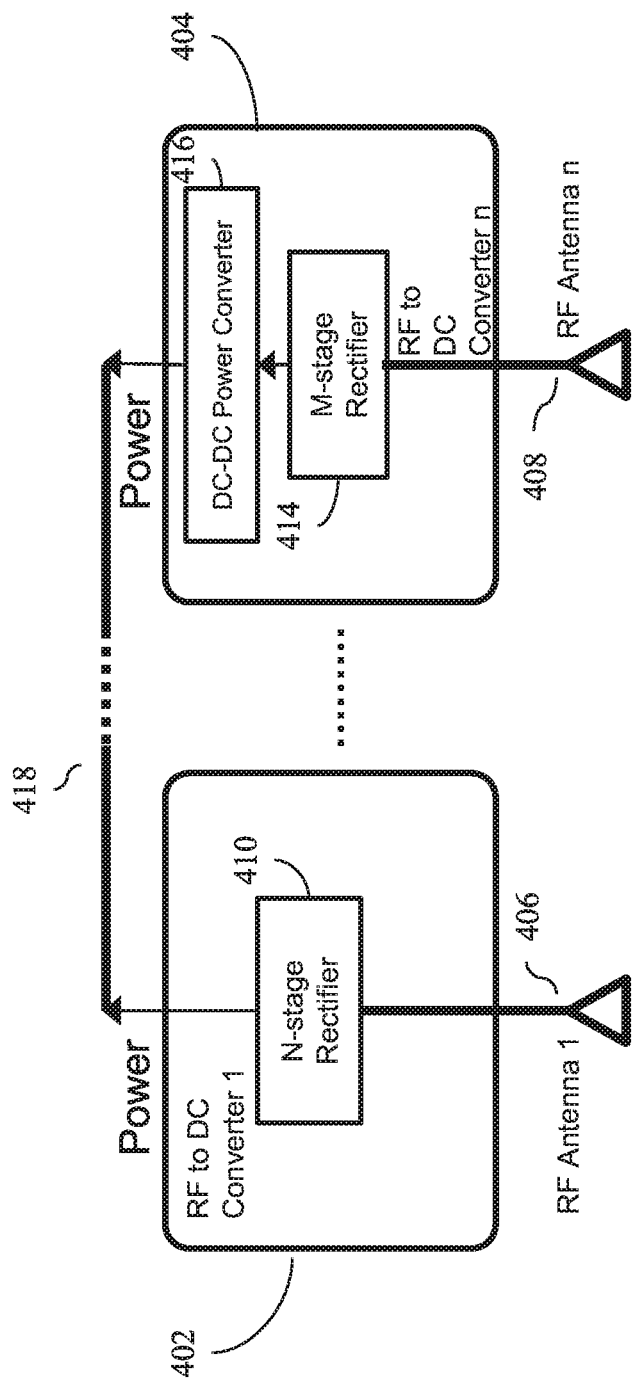
FIG. 4 is another diagram illustrating a tag circuitry in one embodiment.
Figure 8A:
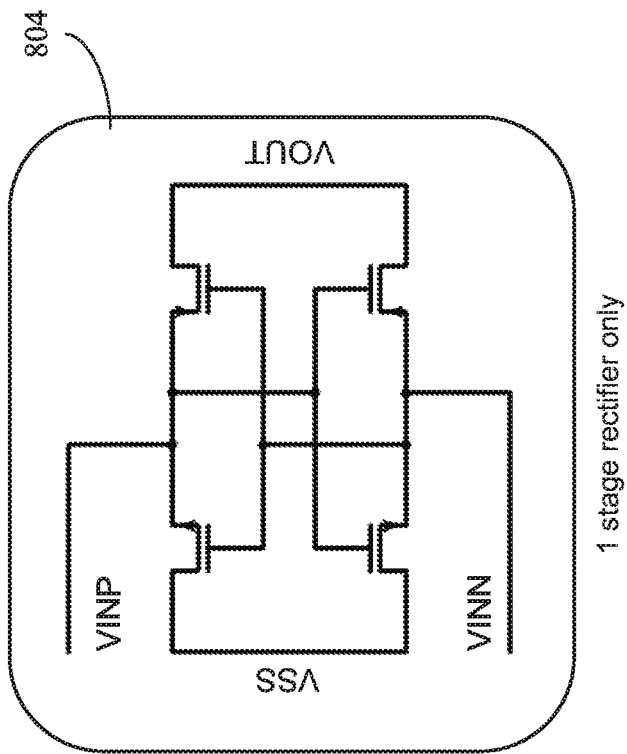
FIG. 8A shows an example schematic diagram of a stage of a multi-stage rectifier in one embodiment.

FIG. 4 is another diagram illustrating a tag circuitry in one embodiment. For instance, component 402 may be a specific embodiment of component 304 shown in FIG. 3; component 404 may be a specific embodiment of component 312 shown in FIG. 3. Power connection 418 may be implemented as described above with reference to 318 in FIG. 3. A tag may include multiple RF-to-DC converters (e.g., RF-to-DC converter 1 . . . RF-to-DC converter n) 402, 404. Each RF-to-DC converter has, or is connected to, an antenna interface or antenna 406, 408. Power received from each tag antenna can be combined, for example, directly using rectifiers. In another aspect, power can be combined using additional converter such as a DC-DC power converter. In some embodiments, the RF-to-DC converters 402, 404 are designed to add power and not have any loading when a given frequency is unavailable (for example, if that corresponding reader antenna is off, or if the channel characteristics have a higher loss). In some embodiments, an RF-to-DC converter 402 may include an N-stage rectifier 410. An example schematic of 1-stage of a multi-stage rectifier is shown in FIG. 8A, 802. In one aspect, an N-stage rectifier 410 has an open circuit voltage of N*Vin (input voltage), and an actual voltage is a function of parasitics and the loading from subsequent circuits. For instance, provided that an output voltage is less than N*Vin, an N-stage rectifier 410 can provide power in a system implementing the rectifiers (tag). "N" may be an integer greater than zero. For instance, if N=1, a one-stage rectifier circuit, e.g., shown in FIG. 8B at 804, can be used for the N-stage rectifier block 410, and if N>1, a multi-stage rectifier circuit can be used. An example of a 1-stage of a multi-stage rectifier circuit is shown in FIG. 8A, 802.

In one aspect, a passive rectifier without an input RF power on an antenna port only contributes leakage. For example, the only leakage in the rectifier is the loading. In this case, for "N-stage rectifier" implementation, a tag can be designed so that there is minimum loading.

Figure 8B:
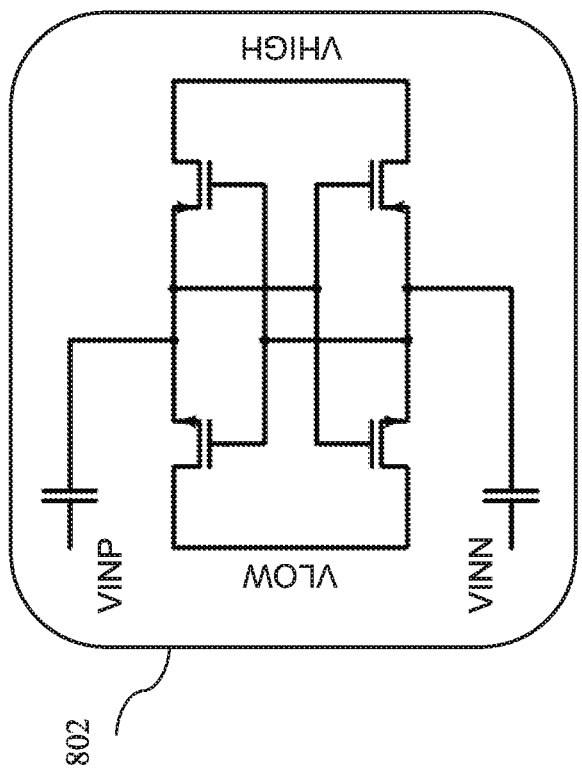
FIG. 8B shows an example schematic diagram of a one stage rectifier in one embodiment.

In some embodiments, an RF-to-DC converters 404 may include an M-stage rectifier 414 connected with a DC-DC power converter 416. "M" may be an integer greater than zero. An example schematic of 1-stage rectifier is shown in FIG. 8B, 804. In one aspect, a single stage rectifier implementation eliminates coupling capacitors. Such implementation can reduce parasitic capacitances, reduce area implementation, and provide higher frequency of operation for the circuit. A separate DC-DC power converter 416 can be implemented increase the output voltage. For instance, a DC-DC power converter 416 can provide additional voltage multiplication. Provided that an open circuit voltage of each RF-to-DC converter is higher than the operating voltage (loaded), the power from the rectifiers add, for example, shown at 418. In one aspect, a DC-DC power converter 416 may cutoff when not enough power is available on the antenna port or interface. For instance, an implementation may use M-stage rectifier metrics to turn on/off the DC-DC converter 416. Such implementation can measure direction of power in the DC-DC converter 416, or measure open circuit voltage of the M-stage rectifier 414. Examples of a DC-DC power converter 416 may include, but are not limited to, a charge pump, linear regulator, a switch, and an inductive power converter. In some embodiments, if M=1, a one-stage rectifier circuit, for example, shown in FIG. 8B at 804, can be used for the M-stage rectifier block 414, and if M>1, a multi-stage rectifier circuit can be used. An example of a 1-stage of a multi-stage rectifier circuit is shown in FIG. 8A, 802. For instance, depending on the value of N and M, one of the schematics shown in FIG. 8A and FIG. 8B may be used for a rectifier implemented for a tag.

Figure 5:
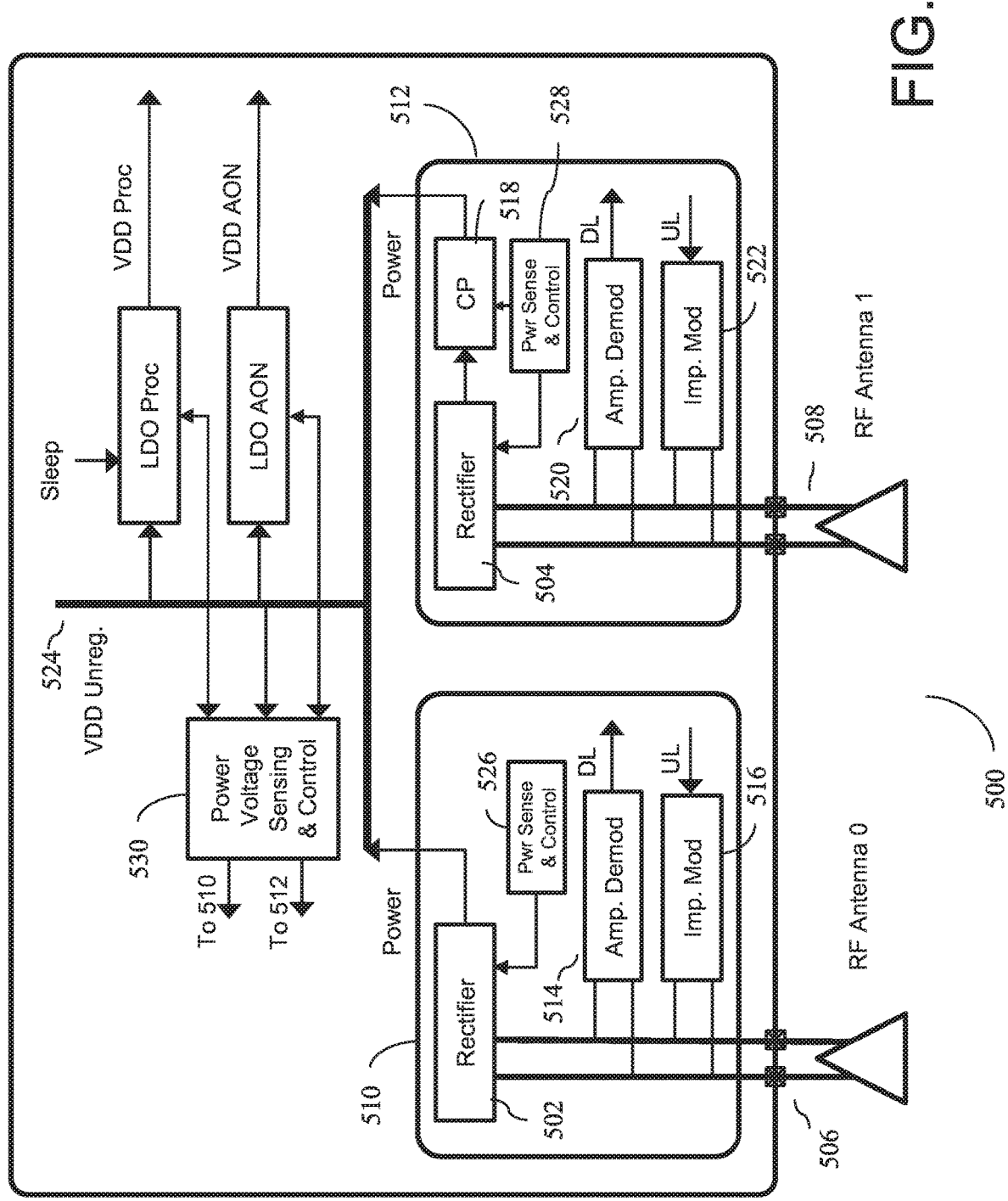
FIG. 5 illustrates a tag implemented on a computer integrated circuit or chip in one embodiment.

FIG. 5 illustrates a tag implemented on a computer integrated circuit or chip in one embodiment. A tag 500 may include a plurality of rectifiers 502, 504, implemented in respective RF-to-DC converters 510, 512, which can convert radio frequency (RF) to power. An example rectifier 502 may be an N-stage rectifier (e.g., 3-stage rectifier). A rectifier 502 is connected to an RF antenna interface 506. RF antenna interface 506 is capable of bidirectional communication, for example, receive and transmit communication or electromagnetic waves. An amplitude demodulator 514 may be connected with a rectifier 502 and also with an antenna interface 506, and may demodulate amplitude in received signals for data downlink. An impedance modulator 516 may be connected with a rectifier 502 and also with an antenna interface 506, and may perform modulation for data uplink.

A rectifier 504, for instance, implemented as RF-to-DC converter 512, may be a single stage rectifier and may be connected to a DC-DC converter, for example, a charge pump power converter 518, for instance, for providing voltage multiplication. Rectifier 504 is connected to an antenna interface 508. An amplitude demodulator 520 may be connected with a rectifier 504 and also with an antenna interface 508, and may demodulate amplitude in received signals for data downlink. An impedance modulator 522 may be connected with a rectifier 504 and also with an antenna interface 508, and may perform modulation for data uplink.

Combined power from the rectifiers 502, 504 can be connected to supply voltage 524, for example, of a transistor or logic in an integrated circuit. As an example, on-chip regulation may be at 0.8V (volts) nominal with modes going down to 0.5V operation. Open-circuit voltage for each rectifier can be nominally about 0.9 to 1.5V. In one aspect, since the operating point of the regulator is about 0.5V to 0.8V, the power adds when there is power on both output ports of rectifiers 502, 504. In cases in which power harvested by the antennas is relatively low and the corresponding loaded output voltage of each individual rectifier is lower, the presence of two parallel interfaces can push the loaded voltage higher, thus enabling wider range of operation. In one aspect, the output voltage of the regulators can be chosen statically (e.g., at time of tag manufacture) or dynamically by the tag itself, in order to reduce loading sufficiently for the rectifiers to provide necessary voltage levels and for the communication to be reliable. In this case, in some embodiment, responsive to more power being available, the tag can reconfigure itself for higher performance.

An aspect of this implementation provides an ability to add power from multiple diverse antennas without each corresponding rectifier loading the power line. For example, a power sense and control component 528 can turn off the rectifier 504 and charge pump (CP) 518 when the voltage output delivered by rectifier 504 attached to RF Antenna 1 508 is lower than the supply voltage of the loading circuit.

In some embodiments, reconfigurable options may be present in the rectifier. For instance, a rectifier 504 can be reconfigured, for example, the number of stages of the rectifier that are enabled can be reconfigured. In some embodiments, a charge pump (e.g., power converter) 518 can be reconfigured, for example, the voltage gain used. In some embodiments, it is possible to keep a rectifier 504 always enabled so that communication occurs on this interface, but the associated CP/power converter 518 can be deactivated so that there is no power overhead from the other rectifiers. This may occur if there is sufficient voltage on a rectifier for communication to occur, but not enough for power harvesting.

Similarly, a power sense and control component 526 can turn off the rectifier 502 when the voltage output delivered by rectifier 502 attached to RF Antenna 0 506 is lower than the supply voltage of the loading circuit. In some embodiments, a rectifier 502 can be reconfigured or turned off if the reconfiguration is still insufficient to add power. In some embodiments, it is possible to still enable communication by disabling only the power harvesting part of the circuit that adds power to 524.

For instance, a power sense and control component can control the operations of a rectifier and any connected power converters (e.g., CP), based on the amount of power the rectifier can rectify or output as input power to the circuit. Multiple rectifiers may be connected in parallel to enable parallel power combining without contributing to loading when a rectifier is not contributing power. For instance, loading can be prevented in case there is no net input power from that rectifier. For example, a charge pump 518 following the rectifier 504 with a feedback mechanism 528 allows the circuit to prevent loading when the rectifier is not contributing power.

The tag 500 may also include a global power, voltage sense and control block 530. This control block 530 can enable reconfiguration of rest of the components of a tag in terms of voltage, frequency, power gating, and/or others, which can adjust the power consumption of the entire tag to enable better handling of power from the various interfaces. This reconfiguration and sensing mechanisms can provide additional information for the control of each of the individual rectifiers and their respective control blocks.

Various embodiments of a tag 500 may be implemented. For instance, an embodiments of a tag 500 may include a tag device with global control where only a global sensing and control block 530 is present (e.g., without circuit blocks shown at 526 and 528). Another embodiment of a tag 500 may include a tag device with distributed control where only the individual control blocks such as 526 and 528 are present (e.g., without circuit block shown at 530). Yet another embodiment of a tag 500 may include a tag device with hierarchical control where both global and distributed circuitry or circuit blocks exist (e.g., 530, 526 and 528). Different embodiments may involve considering different factors, for example, in terms of modularity, complexity, response times, functionality as number of antenna interfaces increases, and/or others.

Figure 6:
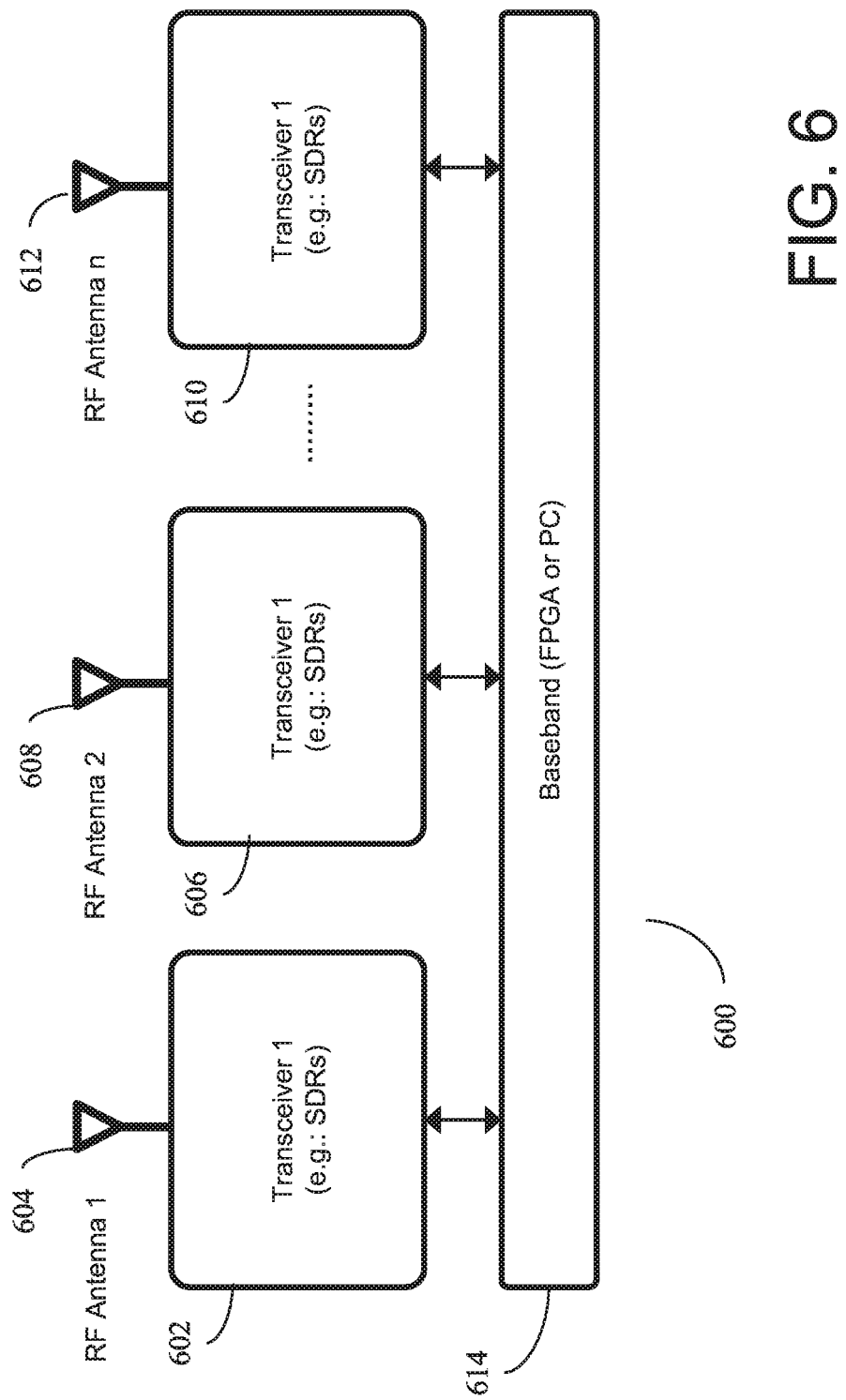
FIG. 6 shows an example implementation of a RF reader device in one embodiment.

FIG. 6 shows an example hardware implementation of a RF reader device in one embodiment. A reader 600 can be implemented with multiple antennas or antenna interfaces, with each antenna connected with a transceiver. For instance, an RF transceiver 602 may be connected with an antenna 604, an RF transceiver 606 can be connected with an antenna 608, an RF transceiver 610 can be connected with antenna 612, and so forth. In one aspect, a factor which may be considered in determining the number of antennas configured for a RF read device can a tradeoff for cost, power, and size, but not limited to such. In some embodiments, antennas can be multi-band. A transceiver configuration can set which frequencies are in use in any given time. An example of a transceiver may be a software defined radio (SDR). Another example of a transceiver may be a dedicated integrated circuit. The transceivers can be connected a controller or another processor such as a programmable gate array (FPGA), a computer's central processing unit (CPU) or an application specific integrated circuit (ASIC) for baseband processing. Program modules or logic may be executed on such processor for baseband processing. Baseband processing at a processor 614 allows for integrating of the transceivers/antennas, so for example, power and resources can be allocated among the different antennas or antenna configurations, e.g., 602, 604, 606, 608, 610, 612. RF reader device implementation need not be limited to the example shown only. Other implementations can be contemplated, for instance, considering cost and/or size constraints of an RF reader-tag system.

A radio frequency identification (RFID) system can have tags and/or readers, which utilize wireless channel diversity to enhance power delivery or to optimize communication. A reader and/or tags can choose optimal frequency band, antenna polarization, and/or another property, for power and data communication, to maximize power delivery, maximize link budget at the reader or a combination of both. For instance, for highest power delivery, a tag may backscatter with weaker antenna; for highest link margin, a tag may backscatter with stronger antenna. In another aspect, a tag can tag use backscatter on two antenna polarizations simultaneously to maximize link budget. A reader may adjust one or more of the reader's antenna polarization to maximize link budget that in turn maximizes power delivery to the tags. A tag may adjust the tag's modes of operation based on available power and link budgets at the tag's antenna interfaces.

Figure 7:
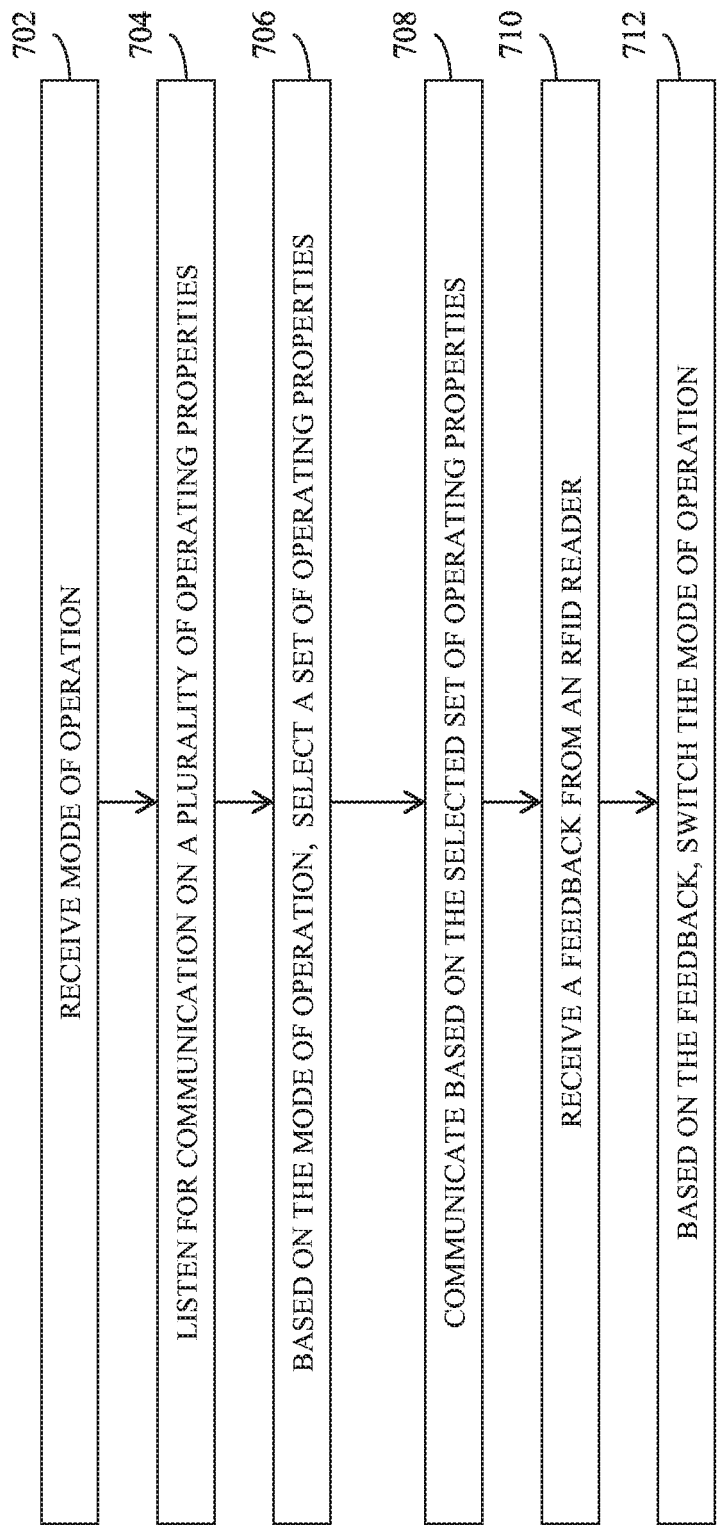
FIG. 7 is a flow diagram illustrating a method of leveraging channel diversity in RF communications in one embodiment.

FIG. 7 is a diagram illustrating a method in one embodiment performed by a radio frequency identification (RFID) tag, which may include multiple of antennas coupled with associated circuitry, each of the multiple antennas tuned for a different operating region. Examples of operating regions may include frequency, polarization, bandwidth, range and power level. At 702, a mode of operation may be received. Modes of operation may include optimizing power delivery and optimizing communication link budget. At 704, the tag may listen for communication on a plurality of operating regions, which communication is being radiated by an RFID reader radiating power on the plurality of operating regions. At 706, based on the mode of operation, the tag can select an operating region in which to operate. For instance, the tag can select a set of operating regions or an operating region space, for example, different antennas at different frequencies operating simultaneously. At 708, the tag communicates in the selected set of operating regions. For example, responsive to determining that the mode of operation is maximizing power harvesting, the tag may communicate on a frequency band with lower power. As another example, responsive to determining that the mode of operation is maximizing communication range, the tag may communicate on a frequency band with higher power. At 710, the tag may receive a feedback from an RFID reader. At 712, based on the feedback, the tag may switch the mode of operation.

In another aspect, a method may include, in a radio frequency identification (RFID) tag, connecting multiple antennas with associated circuitry in parallel. The method may also include tuning each of the multiple antennas for a different operating region such that the radio frequency identification tag is configured to support wireless channel diversity in enhancing at least one of power delivery and communication, the different operating region comprising at least one of frequency, polarization, bandwidth, range and power level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a radio frequency identification (RFID) tag comprising multiple antennas coupled with associated circuitry, each of the multiple antennas tuned for a different operating property, wherein the radio frequency identification tag is configured to use wireless channel diversity in enhancing at least one of power delivery and communication link budget, wherein the RFID tag is configured to select a set of operating properties based on available power and communication capacity at interfaces associated with the multiple antennas.

2. The system of claim 1, wherein the different operating property comprises at least one of frequency, polarization, bandwidth, radiation pattern, range and power level.

3. The system of claim 1, wherein the RFID tag selects an operating property based on determining to optimize for power delivery.

4. The system of claim 3, wherein the RFID tag is configured to use backscatter on two antenna polarizations simultaneously in maximizing the communication link budget.

5. The system of claim 1, wherein the RFID tag selects an operating property based on determining to optimize communication link budget.

6. The system of claim 1, wherein an antenna of the multiple antennas and associated circuitry are configured to support a frequency different from another frequency supported by another antenna of the multiple antennas.

7. The system of claim 1, wherein an antenna of the multiple antennas and associated circuitry are configured to support a polarization different from another polarization supported by another antenna of the multiple antennas.

8. The system of claim 1, wherein an antenna of the multiple antennas and associated circuitry are configured to support a radiation pattern different from another radiation pattern supported by another antenna of the multiple antennas.

9. The system of claim 1, wherein the associated circuitry comprises a radio frequency-to-direct current (RF-to-DC) converter, wherein the multiple antennas coupled with multiple RF-to-DC converters respectively, are connected in parallel and power received from the multiple antennas are combined as aggregated power for usage.

10. The system of claim 9, wherein each of the multiple antennas and associated circuitry are configured to operate in different modes, the different modes comprising power optimization, data uplink optimization and data downlink optimization, and the different modes of operations are selectable.

11. The system of claim 9, wherein the RF-to-DC converter comprises an N-stage rectifier, wherein N is an integer from 1 to a predefined number.

12. The system of claim 11, wherein the N-stage rectifier is implemented in an integrated circuit and the multiple antennas are implemented external to the integrated circuit, wherein an operating mode can be selected by selecting an external component.

13. The system of claim 9, wherein at least one of the multiple RF-to-DC converters comprises:
    a rectifier connected to an antenna of the multiple antennas, the rectifier directly outputting the power received from the antenna for combining.

14. The system of claim 9, wherein at least one of the multiple RF-to-DC converters comprises:
    a rectifier connected to an antenna of the multiple antennas and operable to rectify power received at the antenna;
    a power converter connected to the rectifier and operable to provide voltage multiplication to the rectified power.

15. The system of claim 9, wherein at least one of the multiple RF-to-DC converters comprises:
    a rectifier connected to an antenna of the multiple antennas and operable to rectify power received at the antenna;
    a power converter connected to the rectifier and operable to provide voltage multiplication to the rectified power;
    a power sense and controller connected to the rectifier and to the power converter, the power sense and controller operable to turn on and off the rectifier and the power converter based on an amount of power rectified in the rectifier and multiplied in the power converter.

16. The system of claim 9, wherein at least one of the multiple RF-to-DC converters comprises:
    a single stage rectifier without coupling capacitors, the single stage rectifier connected to an antenna of the multiple antennas and operable to rectify power received at the antenna; and
    a power converter connected to the rectifier.

17. A radio frequency identification (RFID) reader comprising:
    multiple radio frequency antennas and associated transceivers, wherein the reader is configured to adjust antenna polarization associated with at least one of the multiple radio frequency antennas, the reader is further configured to select a frequency band and antenna polarization based on determining to optimize power delivery.

18. The RFID reader of claim 17, wherein the reader is further configured to select a frequency band and antenna polarization based on determining to optimize communication.

19. A method performed by a radio frequency identification (RFID) tag with multiple of antennas coupled with associated circuitry, each of the multiple antennas tuned for a different operating region, the method comprising:
 receiving a mode of operation;
 listening for communication on a plurality of operating regions, the communication being radiated by an RFID reader radiating power on the plurality of operating regions;
 based on the mode of operation, selecting a set of operating regions to operate in;
 communicating in the selected set of operating regions;
 receiving a feedback from an RFID reader; and
 switching the mode of operation based on the feedback.

* * * * *